US012153989B2

(12) United States Patent
Rius Pascual

(10) Patent No.: US 12,153,989 B2
(45) Date of Patent: Nov. 26, 2024

(54) HIGH-SPEED TUNNEL FOR THE READING AND MASS ENCODING OF RFID LABELS CONTAINED IN A PACKAGE

(71) Applicant: RIELEC AUTOMATIZACIÓN INDUSTRIAL SL, Ontinyent (ES)

(72) Inventor: Luis Rius Pascual, Ontinyent (ES)

(73) Assignee: RIELEC AUTOMATIZACIÓN INDUSTRIAL SL, Ontinyent (ES)

( * ) Notice: Subject to any disclaimer, the term of this patent is extended or adjusted under 35 U.S.C. 154(b) by 4 days.

(21) Appl. No.: 17/925,453

(22) PCT Filed: May 14, 2021

(86) PCT No.: PCT/ES2021/070347
§ 371 (c)(1),
(2) Date: Nov. 15, 2022

(87) PCT Pub. No.: WO2021/229133
PCT Pub. Date: Nov. 18, 2021

(65) Prior Publication Data
US 2023/0186041 A1    Jun. 15, 2023

(30) Foreign Application Priority Data

May 15, 2020   (ES) .............................. ES202030929U
May 14, 2021   (ES) .............................. ES202130987U

(51) Int. Cl.
   *G06K 7/10*       (2006.01)
(52) U.S. Cl.
   CPC ..... *G06K 7/10366* (2013.01); *G06K 7/10435* (2013.01); *G06K 7/10445* (2013.01)

(58) Field of Classification Search
None
See application file for complete search history.

(56) References Cited

U.S. PATENT DOCUMENTS

| | | |
|---|---|---|
| 9,760,826 B1 | 9/2017 | Stine et al. |
| 2006/0022826 A1 | 2/2006 | Higham |
| 2011/0043337 A1 | 2/2011 | Pierre |
| 2013/0342321 A1* | 12/2013 | Zogg .................. G06K 7/01 340/10.1 |
| 2016/0217306 A1 | 7/2016 | Zimmerman et al. |
| 2017/0206387 A1 | 7/2017 | Goidas et al. |

(Continued)

FOREIGN PATENT DOCUMENTS

EP         3432193 A1    1/2019

*Primary Examiner* — Suezu Ellis
(74) *Attorney, Agent, or Firm* — The Webb Law Firm

(57) ABSTRACT

The invention describes a high-speed tunnel for the reading and mass encoding of RFID labels contained in a package, integrated in a housing with respective counterposed inlet and outlet orifices, and in the interior whereof a transport means is established, by means of which the package is displaced; likewise one or more high-power antennas for the measurement of RFID labels and a photocell for the detection of the entry of packages into the tunnel; these elements being controlled by means of a control unit associated with an electrical switchboard. A number of guillotine doors or box doors in the tunnel enable the rapid identification and encoding of the labels of the elements present in a package by means of RFID technology, yielding a device of reduced dimensions.

7 Claims, 5 Drawing Sheets

(56) References Cited

U.S. PATENT DOCUMENTS

2017/0351885 A1    12/2017  Loussert et al.
2020/0173231 A1*  6/2020  Drifka .................... E06B 9/581
2022/0324656 A1*  10/2022  Miyamoto ............ B65G 43/08

* cited by examiner

HIGH-SPEED TUNNEL FOR THE READING AND MASS ENCODING OF RFID LABELS CONTAINED IN A PACKAGE

CROSS-REFERENCE TO RELATED APPLICATIONS

This application is the United States national phase of International Application No. PCT/ES2021/070058 filed Jan. 27, 2021, and claims priority to Spanish Patent Application No. P202030101 filed Feb. 7, 2020, the disclosures of which are hereby incorporated by reference in their entirety.

BACKGROUND OF THE INVENTION

Field of the Invention

The present invention relates to a high-speed tunnel which enables the simultaneous reading and mass encoding of a large volume of RFID labels in a short time, in a very advantageous manner. Specifically, the tunnel of the invention is used for the identification and mass encoding of RFID labels contained in a package or product which is displacing automatically through the inside of the developed tunnel.

The object of the invention is to obtain a tunnel which, while yielding a reduced dimensions, allows the quick identification and coding of the labels of the elements present in a package by means of RFID technology.

Description of Background Art

RFID (Radio Frequency Identification) technology allows the identification, storage, and transmission of remote data stored in labels using, for such purpose, radio frequency. For this reason, RFID technology is widely used in parcel deliveries and logistics for the efficient monitoring and control of items being shipped based on the orders received.

Tunnels that identify the measurements of RFID labels when they are located in the same container or package, allowing a plurality of RFID labels to be read simultaneously, are known in the current state of the art.

The main drawback of the known tunnels lies in the time invested in reading and encoding a large number of labels.

In addition, another drawback of the known equipment lies in the large dimensions of this type of equipment, which makes the installation thereof difficult, occupying large spaces in companies with the corresponding failure to fully utilize a useful asset.

The current equipment does not have isolation systems that prevent unwanted reading of items with labels which, being located close to the tunnel, are not the object of measurement.

Therefore, it is verified that the present applicant is unaware of any known equipment which allows the processing of large volumes of labels simultaneously and in very short periods of time.

In view of the above, the applicant of the present utility model application identifies the need to develop a tunnel of reduced dimensions which offers an effective solution for the fast and efficient measurement of a large number of RFID labels contained in the parcels to be monitored, preventing the unwanted reading of other packages or products which are not the object of measurement.

SUMMARY OF THE INVENTION

The disclosed tunnel enables a large number of RFID labels to be read simultaneously in a quick manner, specifically up to 200 labels per second.

Advantageously, the tunnel of the invention preferably has a length of one meter, being significantly shorter than known tunnels.

Likewise, in a first embodiment, the tunnel of the invention is provided with guillotine entry and exit doors which open and close quickly, with these elements being essential in order to offer a high reading speed.

The mentioned guillotine entry and exit doors of the tunnel allow enclosing therein a parcel or package for the reading of RFID labels which allow identifying the products it contains.

In this way, it is feasible to simultaneously read a large number of RFID labels by using a high incidence power antenna acting inside the tunnel.

Specifically, the guillotine entry and exit doors remain closed during the emission of the high-power antenna, demarcating a closed enclosure, and prevent the emitted wave from ricocheting out of the mentioned demarcated enclosure. In other words, guillotine entry and exit doors prevent the waves from ricocheting to areas in which the package or product to be identified is not located, so unwanted cross-reading due to the presence of packages or products close to other RFID labels, the reading of which is not desired at that moment, is prevented.

That is why the tunnel of the invention is a system that offers a high effectiveness in the massive reading of RFID labels simultaneously, with the percentage of errors or rejections being minimal.

In view of the above, the essence of the developed invention focuses on the mechanical configuration to provide high speed closing and opening of the guillotine entry and exit doors and to thereby increase the speed for the reading and mass encoding of RFID labels.

The guarantee offered by the tunnel for encapsulating the package or product to be read allows shortening the length of the equipment, considerably reducing its dimensions with respect to known equipment, which also works at a lower reading speed.

Optionally, it has been envisaged that, in a second embodiment of the invention, the guillotine entry door and the guillotine exit doors are complemented by side walls making up a vertically displaceable box, which displaces upwards (an open position) and downwards (a lower/closed position or reading mode).

Therefore, in the downward displacement of the box, a leak-tight space which allows the reading and mass encoding of RFID labels to be carried out with greater assurance is generated.

This leak-tight space is demarcated by the box and a lower tray on which the box rests in its closed position in order to generate the leak-tight space.

In this way, both the inlet and the outlet of the tunnel are controlled with only vertical displacement means for the box, thereby requiring fewer mobile elements to be controlled, which simplifies the structure and reduces maintenance, in addition to preventing possible conflicting situations as could happen in the first embodiment of the invention, in the event of a poor synchronization in the opening and closing of the entry and exit doors.

Optionally, the box will be perforated in order to reduce the weight of the box.

The installation of weighing cells for determining the weight of the goods introduced into the tunnel has also been optionally envisaged. In this way, an additional measurement parameter is added to know the weight of the package.

It has also been envisaged that, instead of being integrated in the tunnel, the electrical switchboard is an independent element in the second embodiment of the invention, allowing the tunnel itself to occupy less space and to offer greater versatility for its installation. The electrical switchboard is wired to the tunnel to enable communication between them.

BRIEF DESCRIPTION OF THE DRAWINGS

As a complement to the description that will be provided herein, and for the purpose of helping to make the features of the invention more readily understandable, according to a preferred practical exemplary embodiment thereof, said description is accompanied by a set of drawings constituting an integral part thereof in which, by way of illustration and not limitation, the following is represented.

DETAILED DESCRIPTION OF THE INVENTION

Figure 1:
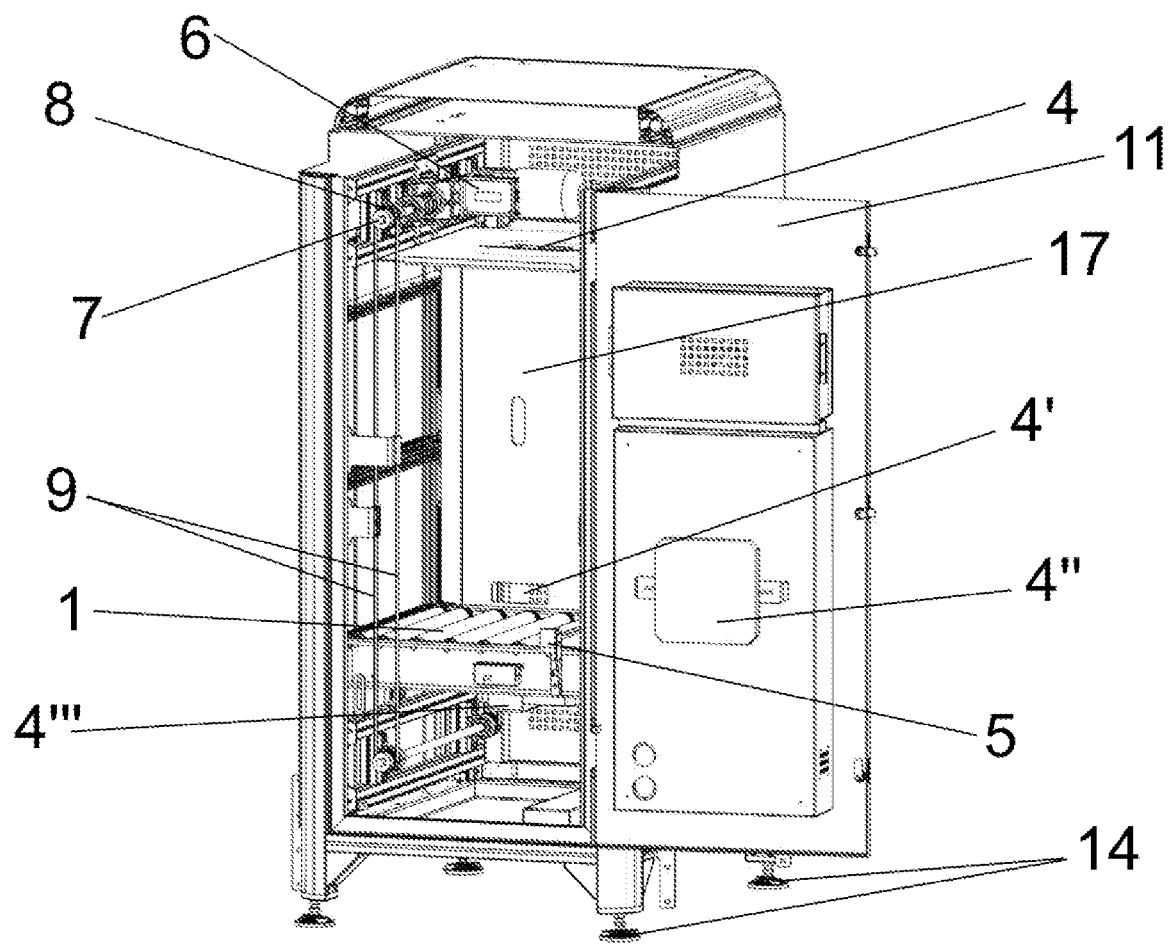
FIG. 1 shows a side view of the tunnel of the invention, showing the interior of the tunnel made according to a first preferred embodiment of the object of the present invention.
Figure 2:
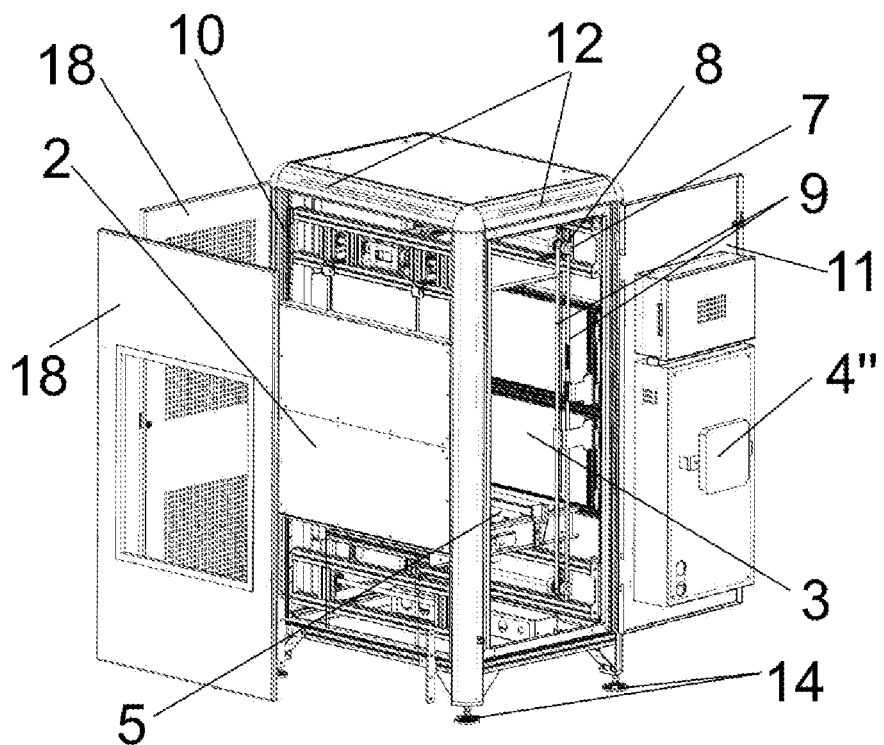
FIG. 2 shows a perspective view of the depiction of the tunnel of the invention according to a first embodiment of the invention, in which the housings and side door are displaced to observe the inside of the tunnel.

In view of the mentioned figures accompanying the present invention, it can be seen specifically in FIGS. 1 and 2 that the high-speed tunnel for the reading of a massive number of RFID labels contained in a package is made up in a first preferred embodiment of the invention of at least the following elements:
transport means (1) by means of which the package is displaced,
a guillotine entry door (2) for actuating the quick opening and closing thereof,
a guillotine exit door (3) for actuating the quick opening and closing thereof,
a high-power antenna (4) for the measurement of RFID labels, and
a photocell (5).

As shown in FIG. 1, in which the side door (11) of the tunnel is open, the transport means (1) are preferably made up of a plurality of rollers that facilitate the transport of packages or products to be read, the transport means (1) being automated to facilitate the mentioned displacement.

In this way, when a package is located on the transport means (1), the photocell (5) identifies its presence and actuates the closing of the guillotine entry door (2) and the guillotine exit door (3) by means of a motor (6) associated with a drive shaft (7), pulleys (8), and belts (9). The mentioned elements are clearly seen in FIG. 2, in which the tunnel of the invention is depicted by removing the outer housings (18) and the side door (11) giving access to the inside of the tunnel.

Specifically, in a closed position, the guillotine entry door (2) and the guillotine exit door (3) allow activating the antenna (4) for the measurement or reading of RFID labels present inside the tunnel.

Preferably, as depicted in FIG. 1, the tunnel has a plurality of antennas, specifically four high-power antennas (4), (4'), (4"), (4'''), with one antenna (4) being located in the upper part of the tunnel, a second antenna (4') in the rear part of the tunnel, a third antenna (4") in the side door (11) itself, and a fourth antenna (4''') in the lower part of the transport means (1) to ensure that the emission of the set of antennas emits completely sweeping the closed enclosure demarcated by the tunnel.

Precisely, the mentioned antennas (4), (4'), (4") and (4''') are in charge of emitting high-power radio frequency waves, identifying and measuring the plurality of RFID labels contained in the packages arranged on the transport means (1).

Figure 3:
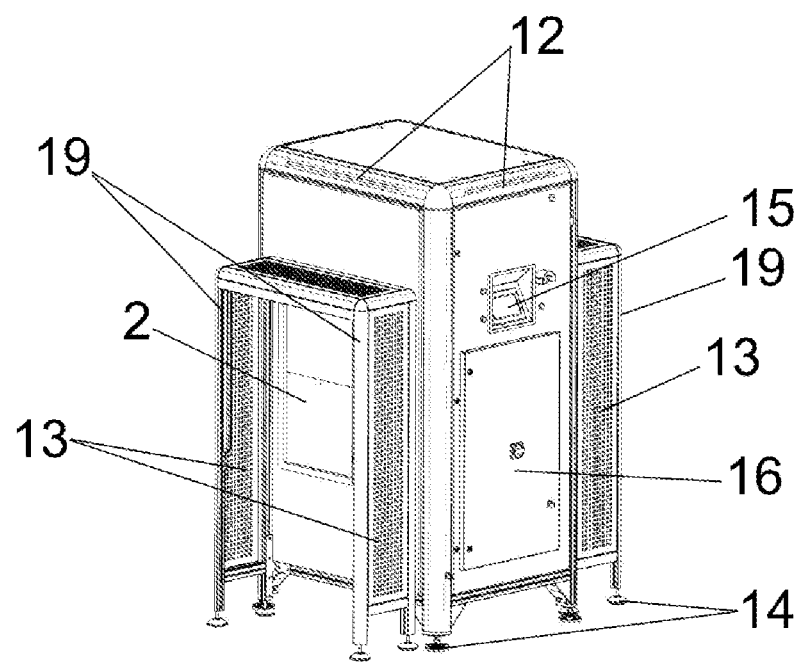
FIG. 3 shows a perspective depiction of the tunnel of the invention according to the embodiment depicted in the preceding figures.
Figure 4:
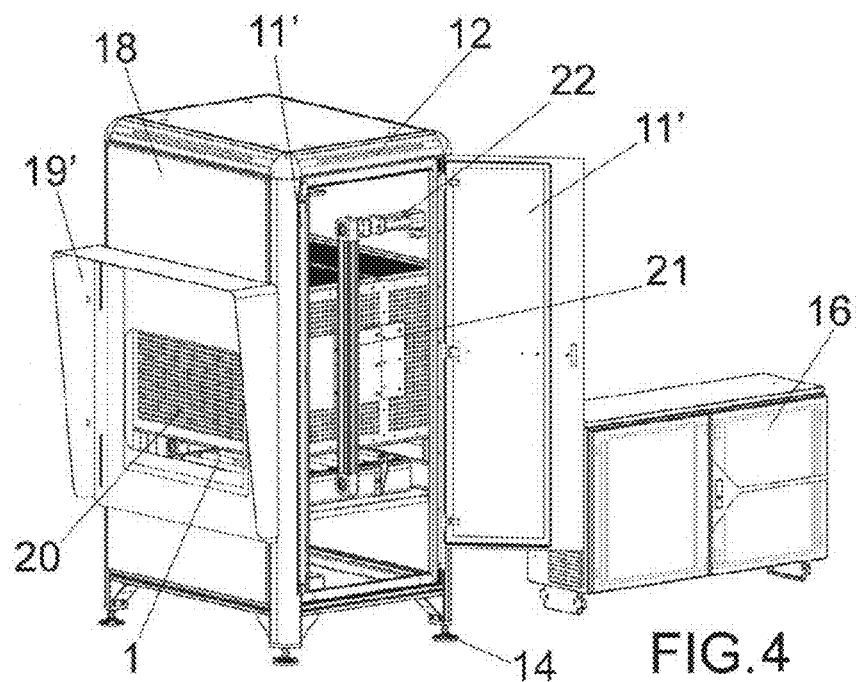
FIG. 4 shows a perspective view of the tunnel made according to a second preferred embodiment of the object of the present invention.
Figure 5:
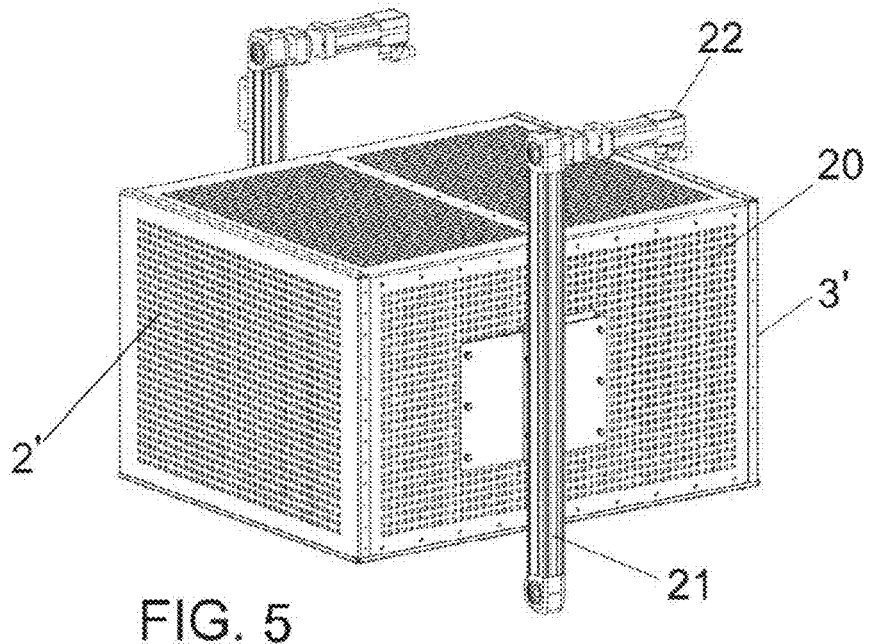
FIG. 5 shows a perspective view of a detail of the box and the drive mechanism thereof found in the interior of the tunnel of FIG. 4.
Figure 6:
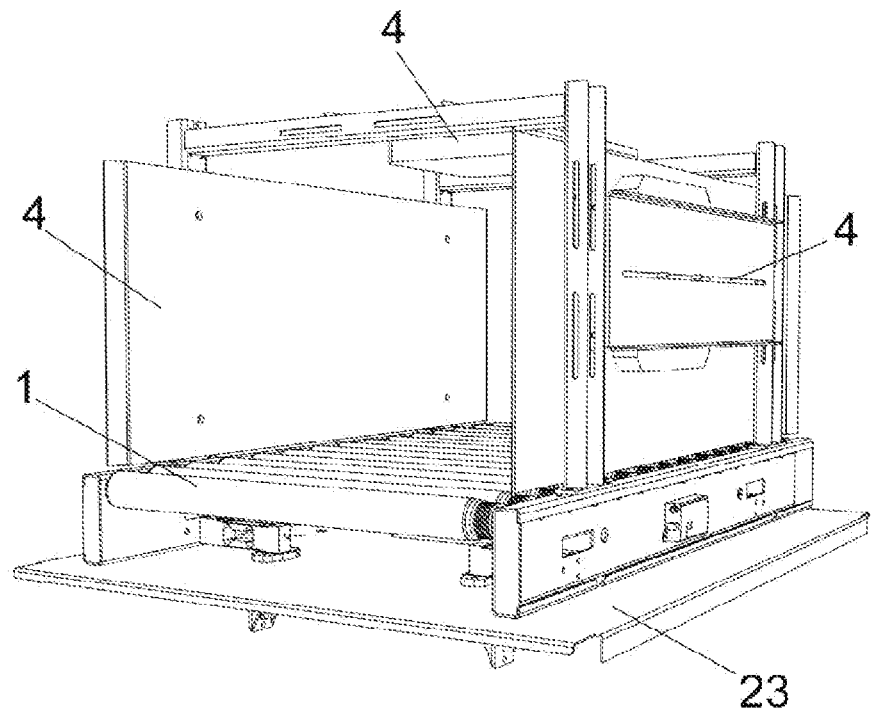
FIG. 6 shows a perspective view of a detail of the inner structure of the tunnel, on which the box of FIG. 5 is vertically displaceable.

It should be noted that all the elements making up the high-speed tunnel are controlled by means of a control unit (15), with the control unit (15) being associated with an electrical switchboard (16) for its correct operation, as shown in FIG. 3.

It should be highlighted that the guillotine entry door (2) and the guillotine exit door (3) run through guides (10) during operation.

Optionally, both the guillotine entry door (2) and the guillotine exit door (3) have a gasket, not shown in the figures accompanying the present specification, located on their perimeter. The mentioned gasket is preferably made of a textile material that is opaque to the RFID signal.

On the other hand, the high-speed tunnel preferably has a plurality of beacons (12) which allow visually displaying the process status of the machine. For example, the beacons (12) visually and/or audibly indicate the following times:
the operation of the tunnel in which the products or packages displace automatically through the transport means (1),
the stop, or
the moment of reading the packages in which the antennas (4), (4'), (4") and (4''') are emitting.

Optionally, it can be seen in FIG. 3 that the high-speed tunnel has a pre-tunnel (13) and a post-tunnel (13) installed before the guillotine entry door (2), making up a pre-tunnel, and after the guillotine exit door (3), making up a post-tunnel, to increase the safety distances between packages and to prevent the wave emitted by the high-power antennas from propagating to the outside of the tunnel of the invention. Preferably, safety barriers (19) are arranged over the pre-tunnel (13) and the post-tunnel (13) in order to prevent entrapment of third parties, as can be seen in FIG. 3.

Advantageously, both the pre-tunnel (13) and the post-tunnel (13) prevent the occurrence of interference or cross-reading with other RFID labels in close proximity to those the identification of which is actually desired. For example, if a package is outside the tunnel, but very close to the guillotine entry door (2), both the presence of the pre-tunnel and the complete closure of the guillotine entry door (2) ensure that the waves emitted by the antennas (4), (4'), (4") and (4''') do not reach the RFID labels located close to the object of measurement.

Additionally, the high-speed tunnel is made up of a flap closing device (17). As can be seen in FIG. 1, the flap closing device (17) is preferably formed by a displaceable polycarbonate plate which allows the closing of the flaps of a package to be performed, if necessary in association with two photocells, not depicted in the figures accompanying the present specification, which allow the detection of packages with open flaps.

In view of FIGS. 4 to 8, it can be seen how the high-speed tunnel for the reading and mass encoding RFID labels contained in a package is made up in a second preferred embodiment of the Invention of at least the following elements:

- transport means (1) by means of which the package is displaced,
- a housing (18) with respective counterposed inlet and outlet orifices,
- one or more high-power antennas (4) for the measurement of RFID labels,
- a photocell (5), and
- a box (20) which is vertically displaceable on the assembly formed by the structure carrying the antennas (4) and the transport means (1) and which, in the lowered position, rests on a lower tray (23).

The box (20) is formed as a perforated aluminum box, which, when lowered, contacts the lower tray (23) in order to enclose the parcel or package in a hermetic environment against RFID wave leakage, offering a highly focused and efficient electromagnetic shielding to the box or package. The perforations of the box (20) are just the right size to prevent the passage of waves through the holes, while at the same time allowing the passage of airflow.

Therefore, the transport means (1) are preferably made up of a plurality of rollers which facilitate the transport of the packages or products to be read, with the transport means (1) being automated to facilitate the mentioned displacement, where it may include weighing cells (24). The weighing cells (24) are preferably arranged in the lower part of the rollers.

The box (20) is in turn vertically displaceable through a pair of linear shafts or guides (21), by means of motor-driven mechanisms (22) associated with a controls electronics of the electrical switchboard (16). A front wall (2') of the box and a back wall (3') of the box are a guillotine entry door and a guillotine exit door of the tunnel.

Figure 7:
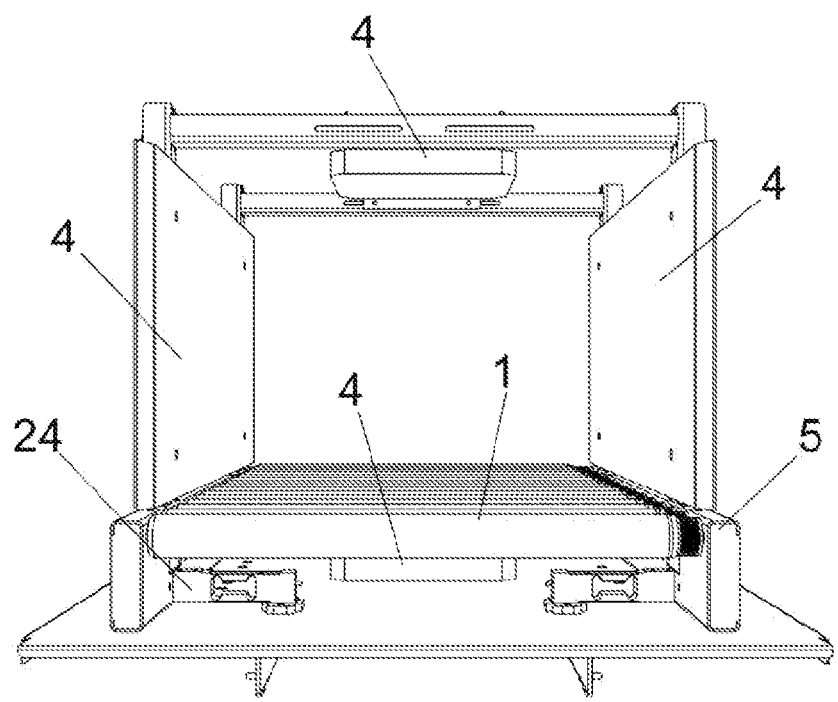
FIG. 7 shows a front perspective view of the assembly of FIG. 6.

As seen in FIG. 7, the lower tray (23) is formed as a simple steel plate folded on all sides, supporting the weight of the roller transporter, weighing cells (24), and antennas (4).

In this way, when a package is located on the transport means (1), the photocell (5) identifies its presence and actuates the lowering of the box (20) through the linear shafts (21) and by means of the motor-driven mechanisms (22). The mentioned elements are clearly seen in FIGS. 5 to 7.

Specifically, the box (20) in the lowered position allows the antenna or antennas (4) to be activated for the measurement or reading of the RFID labels present inside the tunnel.

Preferably, as depicted in FIG. 7, the tunnel has a plurality of antennas (4), specifically four high-power antennas (4) located in the upper part, side, and lower part of the tunnel, to ensure that the emission of the set of antennas (4) emits completely sweeping the closed enclosure demarcated by the tunnel.

Precisely, the mentioned antennas and (4) are in charge of emitting high-power radio frequency waves, identifying and measuring the plurality of RFID labels contained in the packages arranged on the transport means (1).

It should be noted that all the elements making up the high-speed tunnel are controlled by means of a control unit associated with an electrical switchboard (16) for their correct operation which, in this case, is independent, allowing the tunnel itself to occupy less space and to offer greater versatility for its installation. The electrical switchboard (16) is wired to the tunnel to enable communication between them.

On the other hand, the high-speed tunnel preferably has a plurality of beacons (12) which allow visually displaying the process status of the machine. For example, the beacons (12) visually and/or audibly indicate the following times:

- the operation of the tunnel in which the products or packages displace automatically through the transport means (1),
- the stop, or
- the moment of reading the packages in which the antennas (4) are emitting.

In the second embodiment, the invention optionally has a simplified covering structure which is made up of visors (19') installed at the inlet and outlet of the tunnel.

The original covering structures, called "pre-tunnels" in the first embodiment of the invention, took up more space and even required wheels, constituting a bulky accessory.

For this reason, the establishment of visors (19') directly anchored to the tunnel has been optionally envisaged at the inlet and outlet of the tunnel, therefore simplifying its structuring. These visors (19') are formed as inverted U-shaped plates, which serve as a support for fixing additional safety barriers or other elements, preventing operators from accessing the danger zones without cutting the safety barriers, not depicted in the figures.

The advantage of replacing the pre-tunnels with visors (19') in the second embodiment is that these visors occupy less volume and are directly anchored to the machine, thereby simplifying its structuring.

On the other hand, it should be mentioned that in the second embodiment of the invention the maintenance side door of the tunnel structure is also optionally made up of two hinged leaves (11') for greater accessibility and practicality.

Figure 8:
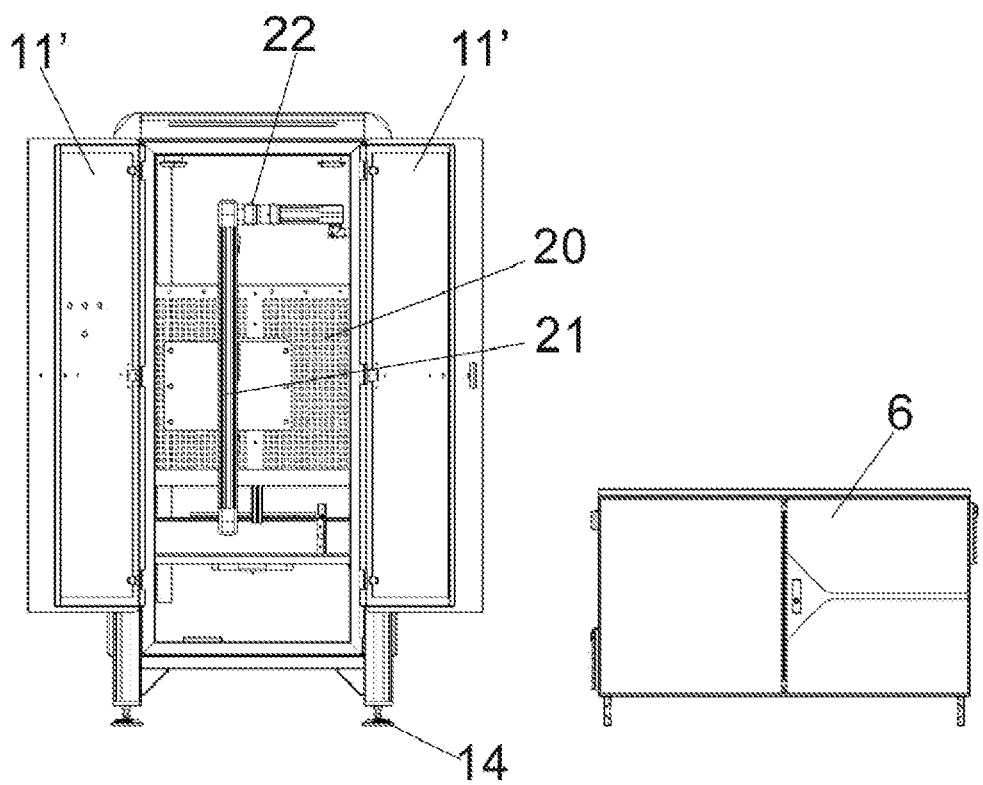
FIG. 8 shows a side view of the tunnel with the maintenance access doors in the open position according to the second preferred embodiment of the invention.

As can be seen in FIG. 8, the main housing (18) of the tunnel may incorporate a pair of hinged doors or leaves (11') in order to access the inside thereof for maintenance.

Finally, it should be noted that the high-speed tunnel optionally has leveling supports (14) at its base, depicted in any of the figures accompanying the present specification, with the elements of the leveling support elements (14) ensuring the installation of the tunnel in a stable position.

The invention claimed is:

1. A high-speed tunnel for reading and mass encoding of radio frequency identification ("RFID") labels contained in a package; the tunnel comprises a housing with respective counterposed inlet and outlet openings, inside the housing there are conveyance means along which the package is moved; the tunnel further comprises a holding structure inside the housing and at least one RFID antenna configured to measure a frequency of the RFID labels, the at least one RFID antenna is supported by the holding structure; the tunnel further comprises a photocell for a detection of an entry of the package into the tunnel, wherein the at least one RFID antenna and the photocell are controlled by means of a control unit, which communicates operational instructions to an electrical switchboard, wherein the tunnel further comprises a box with side walls, and a lower tray arranged under the conveyance means of the tunnel; the box is vertically moveable by means of a pair of linear guides or shafts and by means of motor-driven mechanisms associated with the control unit; the box in a lowered position covers and electromagnetically shields the holding structure, the conveyance means and the package; wherein the box comprises lower edges having arranged seals configured for ensuring RFID shielding between the box and the lower tray such that a Faraday cage is created between the box, the lower tray, and the seals.

2. The high-speed tunnel of claim 1, wherein the box is formed as a perforated aluminum box.

3. The high-speed tunnel of claim 1, wherein the conveyance means include weighing cells.

4. The high-speed tunnel of claim 1, wherein at the inlet and outlet of the tunnel there are visors directly anchored to the tunnel, the visors taking a shape of inverted U-shaped plates.

5. The high-speed tunnel of claim 1, wherein the housing includes a maintenance side access, in which a pair of hinged leaves is arranged.

6. The high-speed tunnel of claim 1, wherein the tunnel further comprises a guillotine entry door and a guillotine exit door.

7. The high-speed tunnel of claim 6, wherein the guillotine entry door and the guillotine exit are two walls of the box.

* * * * *